United States Patent [19]

Bachl et al.

[11] 4,042,770

[45] Aug. 16, 1977

[54] MANUFACTURE OF OLEFIN POLYMERS

[75] Inventors: Robert Bachl, Worms; Hans Frielingsdorf, Bad Duerkheim; Wolfgang Gruber, Frankenthal; Heinz Mueller-Tamm; Leonhard Gonsior, both of Ludwigshafen, all of Germany

[73] Assignee: BASF Aktiengesellschaft, Ludwigshafen, Germany

[21] Appl. No.: 631,642

[22] Filed: Nov. 13, 1975

[30] Foreign Application Priority Data

Nov. 23, 1974 Germany .............................. 2455535

[51] Int. Cl.$^2$ .......................... C08F 4/02; C08F 4/24; C08F 10/00
[52] U.S. Cl. .................................. 526/106; 252/451; 423/327; 423/329
[58] Field of Search ........................ 526/106; 252/451; 423/327, 329

[56] References Cited

U.S. PATENT DOCUMENTS

| | | | |
|---|---|---|---|
| 3,652,216 | 3/1972 | Krekeler et al. ..................... | 423/327 |
| 3,900,457 | 8/1975 | Witt ..................................... | 526/106 |
| 3,960,826 | 6/1976 | Aboutboul et al. .................. | 526/106 |

Primary Examiner—Alan Holler
Attorney, Agent, or Firm—Keil, Thompson & Shurtleff

[57] ABSTRACT

This invention relates to a process for the manufacture of olefin polymers by polymerization of monoolefins with the aid of a silicic xerogel/chromium trioxide catalyst obtained by (1) synthesizing a particulate silicic xerogel, (2) doping this xerogel with chromium trioxide or a chromium compound which converts to chromium trioxide under conditions of stage (3) and (3) maintaining the resulting product at an elevated temperature in a water-free oxygen-containing stream of gas. The characteristic feature of the process of the invention is that the silicic xerogel/chromium trioxide catalyst used is one obtained by (1) synthesizing the silicic xerogel in the first stage as follows: (1.1) taking an aqueous solution of a sodium silicate, (1.2) substituting substantially all of the sodium ions contained in said solution by hydrogen ions by means of an ion exchanger, (1.3) introducing a water-soluble aluminum salt into the resulting aqueous silicic acid solution, (1.4) adjusting the pH of the solution obtained in stage (1.3) to from 0.1 to 3.5, if necessary, (1.5) adjusting the solution obtained in (1.3) or (1.4) to a pH of from 4 to 12 by means of a nitrogen-base compound, (1.6) extracting the product forming the solid phase in stage (1.5) (silicic hydrogel) by means of an alkanol and/or alkanone until the organic liquid absorbs no more water and, finally, (1.7) drying the dehydrated gel saturated with organic liquid resulting from stage (1.6) (xerogel formation). This process makes it possible to obtain polymers having a satisfactory particle size distribution and a favorable melt index.

1 Claim, No Drawings

MANUFACTURE OF OLEFIN POLYMERS

The present invention relates to a process for the manufacture of olefin polymers by polymerization of $C_{2-8}$ α-monoolefins at temperatures of from 60° to 160° C and olefin pressures of from 0.5 to 40 bars by means of a silicic xerogel/chromium trioxide catalyst obtained by (1) synthesizing a particulate silicic xerogel having a particle diameter of from 10 to 2000 μm, (2) doping said xerogel with from 0.1 to 10 percent by weight (based on the xerogel and calculated as chromium) of chromium trioxide or a chromium compound capable of conversion to chromium trioxide under the conditions of stage (3) and (3) finally maintaining the resulting product at a temperature of from 400° to 1100° C for 10 to 1000 minutes in a waterfree stream of gas containing oxygen in a concentration of more than 10% v/v.

Various modifications of such processes are known, the silicic xerogel/chromium trioxide catalyst used being of a specific nature in each case.

Modifications are effected in the synthesis of the catalysts in order to achieve specific aims, such as the following:

a. catalysts capable of providing an increased yield of polymer, i.e.
  $a_1$. catalysts of improved productivity, i.e. systems in which the amount of polymer formed per unit weight of catalyst is increased, and
  $a_2$. catalysts of improved activity, i.e. systems in which the amount of polymer formed per unit weight of catalyst per unit time is increased.
b. Catalysts which show activity at both high and relatively low temperatures, this being significant, for example, for dryphase polymerizations.
c. Catalysts by means of which the morphological properties of the polymers may be influenced in a specific manner, to produce, for example, a uniform particle size and/or a high bulk density, as may be important, for example, for the control of the polymerization system in industrial plants, working up of the polymers and/or processing of the polymers.
d. Catalysts which enable relatively low molecular weight polymers to be obtained in the presence or absence of chain stoppers such as hydrogen, i.e. polymers having a relatively high melt index (better processability).
e. Catalysts adapted for use in specific polymerization processes, for example catalysts particularly suitable for the special needs of suspension polymerization or the special needs of dryphase polymerization.

Experience has shown that of the various aims involved there are some which can be achieved by modifying the preparation of the catalyst only if other aims are disregarded.

For example, it has not hitherto been possible to provide catalysts which afford satisfactory manufacture of polymers which (I) exhibit a relatively narrow particle size distribution and substantial absence of the undesirable very fine portions, whilst at the same time (II) having a sufficiently high melt index when prepared in the absence of chain stoppers. To achieve both ends it has hitherto been necessary to effect polymerization in the presence of chain stoppers, and this in turn has the drawback that the yield of polymer falls considerably.

It is an object of the present invention to provide a catalytic process by means of which both the aims (I) and (II) may be achieved when operating in the absence of chain stoppers or in the presence of comparatively very small amounts of chain stoppers.

We have found that the above object may be achieved, if, in the process defined above, a catalyst is used in which the silicic xerogel has been prepared in a specific manner from an aqueous solution of a sodium silicate.

Thus the present invention relates to a process for the manufacture of olefin polymers by polymerization of $C_{2-8}$ α-monoolefins, particularly ethylene, at temperatures of from 60° to 160° C and in particular from 80° to 110° C and olefin pressures of from 0.5 to 40 bars and in particular from 4 to 15 bars with the aid of a silicic xerogel/chromium trioxide catalyst obtained by (1) synthesizing a particulate silicic xerogel having a particle diameter of from 10 to 2000 μm, (2) doping said xerogel with from 0.1 to 10 percent by weight (based on the xerogel and calculated as chromium) of chromium trioxide or a chromium compound capable of conversion to chromium trioxide under the conditions of stage (3) and (3) maintaining the resulting product at a temperature of from 400° to 1100° C for from 10 to 1000 minutes in an anhydrous stream of gas containing oxygen in a concentration of more than 10% by volume. The process of the invention is characterized in that the silicic xerogel/chromium trioxide catalyst used is one which has been obtained by 1. synthesizing the silicic xerogel in the first stage by
  1.1. taking an aqueous solution of a sodium silicate (water glass), preferably sodium metasilicate ($Na_2SiO_3 \cdot 9H_2O$) which contains from 0.1 to 20% and preferably from 0.3 to 15% and more preferably from 0.3 to 6%, by weight, of solids (calculated as silicon dioxide, $SiO_2$),
  1.2. exchanging the sodium ions contained in said solution for hydrogen ions by means of an ion exchanger so that the sodium content (calculated as sodium oxide, $Na_2O$) in the silicic xerogel is not more than 0.2% and preferably not more than 0.1%, by weight,
  1.3. introducing a water-soluble aluminum salt and, if necessary, water into the resulting aqueous silicic acid solution such that the ratio of water to silicic acid (calculated as silicon dioxide, $SiO_2$), by weight, is from 100:0.05 to 100:24 and preferably from 100:0.1 to 100:17 and more preferably from 100:0.2 to 100:6 and the ratio of silicic acid (calculated as silicon dioxide) to aluminum salt (calculated as aluminum oxide, $Al_2O_3$), by weight, is from 100:100 to 100:2 and preferably from 100:45 to 100:2 and more preferably from 100:25 to 100:7,
  1.4. adjusting, if necessary, the pH of the solution obtained in stage (1.3) to from 0.1 to 3.5 and preferably from 1 to 2 by means of a water-soluble inorganic acid such that the ratios of water to silicic acid and silicic acid to aluminum salt, by weight, remain in the ranges given under (1.3),
  1.5. adjusting the pH of the solution obtained in (1.3) or (1.4) to from 4 to 12 and preferably from 7 to 9 by means of a water-soluble nitrogen-base compound having a neutralizing action,
  1.6. extracting the resulting product in the solid phase obtained under (1.5) (silicic hydrogel) by means of an organic liquid selected from the series of $C_{1-4}$ alkanols and/or $C_{3-5}$ alkanones until the organic liquid absorbs no more water, and, finally, 1.7. drying the dehydrated gel obtained in (1.6) and saturated with organic liquid for a period until no further loss of weight occurs at 120° C (xerogel formation).

The following comments relate to the catalyst to be used in the process of the invention:

1. Stage 1

1.1. Aqueous solutions of sodium silicates, particularly sodium metasilicate, having the solids contents defined above are known per se and are commercially available, and there is thus no necessity to go into this further in the specification. It should merely be mentioned that it is generally better for the purposes of the invention to use solutions which are in a substantially pure state.

1.2. The exchange of sodium ions for hydrogen ions is effected by means of an ion exchanger, this giving systems which are substantially free from undesirable ions. The methods employed and the types of ion exchangers used may be such as are normally used for the exchange of sodium ions for hydrogen ions. This feature thus has nothing special going beyond known features of this kind. For example, one satisfactory method is that described in Gmelins Handbuch der Anorganischen Chemie, 8th edition, Silicon Part B, published by Verlag Chemie GmbH, Weinheim, 1959, page 428, or in Konrad Dorfner, Ion Exchangers, Properties and Applications, Ann Arbor Science Publ. Inc., 1972, page 102.

1.3. A water-soluble aluminum salt and, if necessary, water are introduced into the aqueous silicic acid solution obtained after ion exchange, the amounts of said additions being such that the above weight ratios are achieved. If both an aluminum salt and water are introduced, it is generally convenient to do this in the form of an aqueous solution of the aluminum salt, the amount of concentration of this solution being readily chosen so as to give the desired weight ratio within the limits defined above.

Suitable aluminum salts are only those which liberate no alkali metal ions. Examples of suitable salts are appropriate organic or inorganic salts such as aluminum acetates, benzoate, lactate, fluoride, chloride, bromide, nitrate and sulfate. Of these, the preferred salts are for example aluminum acetate, chloride, bromide, nitrate and sulfate. Aluminum nitrate has proved to be particularly successful.

1.4. In the majority of cases, the solutions resulting from stage (1.3) already have a pH in the range of 0.1 to 3.5 and often in the range of from 1 to 2. If this is not the case, they may be readily adjusted to the desired pH by adding a water-soluble inorganic acid, although care must be taken to ensure that the weight ratios of water to silicic acid and silicic acid to aluminum salt remain in the ranges given under (1.3).

Suitable water-soluble inorganic acids are again only such as liberate no alkali metal ions. Suitable acids are for example HF, HCl, HBr, $HNO_3$, $H_3PO_4$ and $H_2SO_4$. Of these, preferred acids are for example HCl, $HNO_3$ and $H_2SO_4$. $HNO_3$ has proved to be particularly successful.

1.5. During this stage, the silicic hydrogel in the solution obtained from stage (1.3) or (1.4) is precipitated therefrom, this being effected by means of a water-soluble neutralizing nitrogen-base compound, which is added in an amount sufficient to give a pH within the range defined above. Precipitation of the hydrogel may be carried out in conventional manner and offers no problems.

Suitable water-soluble nitrogen-base compounds are again only those which liberate no alkali metal ions. Examples of suitable compounds are appropriate organic or inorganic compounds such as ammonia, hydroxylamine, ethanolamine, n-butylamine, ammonium carbonate and ammonium bicarbonate. Of these, the preferred compounds are for example ammonia, ammonium carbonate and ammonium bicarbonate.

1.6. Extraction of the water from the silicic hydrogels using the organic liquids specified above may take place in conventional extracting equipment. Suitable apparatus include Soxhlet extractors and column extractors. Suitable organic liquids are the following of the series of alkanols (arranged in the order of decreasing activity but not decreasing economical value): t-butanol, i-propanol, ethanol and methanol. Of the alkanones, acetone has proved to be particularly useful. It will be appreciated that the organic liquid may comprise one or more of the above suitable individual compounds, but in all cases the liquid should contain less than 5% and preferably less than 3%, by weight, of water prior to extraction.

1.7. Conversion of the gel saturated with organic liquid to the xerogel (drying) may again be effected in conventional drying equipment. The best results are obtained when drying is effected at product temperatures of from 30° to 140° C and at pressures of from 1 to 760 mm of Hg, the higher temperatures being associated with higher pressures and lower temperatures with lower pressures, for reasons of vapor pressure. Drying may be accelerated, particularly at relatively high pressures, by the use of a flow of entraining gas such as nitrogen.

2. Stage 2

Doping of the xerogel with the chromium component may take place in conventional manner.

However, it has been found to be particularly convenient to dope the xerogel from a 0.05 to 25% w/w solution of chromium trioxide in a $C_{3-5}$ alkanone or a chromium compound capable of conversion to chromium trioxide under the conditions of stage (3) and dissolved in a $C_{1-4}$ alkanol, the solvent used in either case containing not more than 20% and preferably not more than 5%, by weight, of water. The solvent is evaporated to give the desired amount of chromium in the xerogel. Conveniently, this stage may be carried out by suspending the xerogel in a solution of chromium trioxide or a chromium compound capable of conversion to chromium trioxide under the conditions of stage (3) (the amounts being chosen so as to give the desired ratio of xerogel to chromium), the liquid ingredients, i.e. alkanone or alkanol and possibly water, being evaporated off with continual stirring to give as homogeneous a mixture as possible. It is most advantageous to operate at temperatures of from 20° to 150° C and pressures of from 10 to 760 mm of Hg during this stage. It is not critical if the xerogel doped with chromium component contains a certain amount of residual moisture (content of liquid ingredients not more than 20% and preferably not more than 10%, by weight, based on xerogel). Suitable chromium components for this purpose are, in particular, chromium trioxide and chromium hydroxide and also soluble salts of trivalent chromium with an organic or inorganic acid such as chromium acetate, oxalate, sulfate, and nitrate. Particularly suitable salts are those with acids which convert completely to chromium(VI) on activation. Chromium compounds may also be used in the form of chelates, for example chromium acetyl acetonate.

However, doping of the xerogel may also be carried out in conventional manner, for example by mixing the xerogel with solid particulate chromium trioxide and maintaining the mixture at a temperature of from 100° to 300° C and in particular from 150° to 250° C under pressures of from 0.01 to 250 and in particular from 0.1 to 50 mm Hg until the xerogel has absorbed from 0.1 to 10% by weight of chromium trioxide (based on the xerogel and calculated as chromium). This process may be advantageously carried out by mixing the xerogel with from about 0.005 to 0.1 times its weight of solid particulate chromium trioxide having a particle size of from about 10 to 1000 $\mu$m and maintaining the mixture at a temperature in said range and a pressure in the range defined above with constant stirring. The xerogel absorbs an increasing amount of chromium trioxide with time, this chromium trioxide being withdrawn from the mixture of xerogel and chromium trioxide to be firmly anchored to the xerogel.

3. Stage 3

This stage is for activating the catalyst. It may be carried out in conventional manner, i.e., in particular, under conditions ensuring that the chromium in the finished catalyst is at least partially in no other form than the hexavalent state. Suitable methods are described, for example, in German Published Application 1,520,467, sheet 3, line 11 to sheet 4, line 3. The special feature of the process of the invention resides in the novel catalyst used therein.

Apart from this special feature, the process may be carried out in virtually all conventional technological forms, for example as a batchwise, intermittent or continuous process, which may be, for example, a suspension polymerization, solution polymerization or dry-phase polymerization process. The greatest advantages are achieved in the first-mentioned and last-mentioned cases. The said technological forms, in other words the technological modifications of the polymerization of olefins according to Phillips are well known from the literature (see for example German Pat. No. 1,051,004 giving the basic principles and also the published developments thereof) and in practice, and it is therefore unnecessary to go into these in detail.

However, it may be pointed out that the novel process is suitable for the homopolymerization and copolymerization of olefins, for example $C_{2-8}$ $\alpha$-monoolefins. It is particularly suitable for the manufacture of homopolymers of ethylene. As regards the manufacture of copolymers of ethylene with $\alpha$-monoolefins or the manufacture of homopolymers of $\alpha$-monoolefins, particularly suitable $\alpha$-monoolefins are propene, butene-1, 4-methyl-pentene-1, hexene-1 and octene-1. It is not generally necessary in the process of the invention to use hydrogen as chain stopper, although such a chain stopper may be used in relatively small amounts if desired.

Finally, mention may be made of the fact that in the polymerization of olefins by the process of the invention, a considerable advantage may be achieved on account of the fact that the catalysts to be used are obtainable having a particularly high productivity. Thus the amount of catalyst ingredients in the polymer is so low that it has no disturbing effect and removal thereof, which would require a separate step, is generally not necessary. Another important advantage is that the process of the invention makes it possible to produce polyolefins which have an unusually high solution viscosity for a given melt viscosity, i.e. have high molecular weights (weight average) and thus improved mechanical properties in relation to their flowability (melt viscosity).

EXAMPLE 1

Preparation of catalyst

This is carried out by
1. manufacturing, in a first stage, a silicic xerogel by
   1.1. taking a 3 wt.% solids aqueous solution of sodium metasilicate ($Na_2SiO_3 \cdot 9 H_2O$) (solids calculated as silicon dioxide, $SiO_2$),
   1.2. replacing the sodium ions contained in this solution by hydrogen ions by means of an ion exchanger such that the sodium content (calculated as sodium oxide, $Na_2O$) in the silicic xerogel is 0.003% by weight,
   1.3. introducing into the resulting aqueous silicic acid solution a water-soluble aluminum salt (aluminum nitrate) and water so as to make the ratio of water to silicic acid (calculated as silicon dioxide, $SiO_2$) 100:1 by weight, and the ratio of silicic acid (calculated as silicon dioxide) to aluminum salt (calculated as aluminum oxide, $Al_2O_3$) 100:15 by weight,
   1.4. adjusting the pH of the solution resulting from (1.3) to a value of 1.1 by means of water-soluble inorganic acid ($HNO_3$) so as to keep the weight ratios of water to silicic acid and of silicic acid to aluminum salt within the ranges given in (1.3) (100:$\approx$1 and 100:15 respectively after introduction of said acid),
   1.5. adjusting the pH of the solution resulting from stage (1.4) to a value of 8.0 by means of a water-soluble, neutralizing nitrogen-base compound (ammonia),
   1.6. extracting the solid-phase product (silicic hydrogel) resulting from stage (1.5) by means of isopropanol (anhydrous) in a Soxhlet extractor until the organic liquid absorbs no more water, and finally
   1.7. drying the dehydrated, organic liquid-saturated gel obtained from stage (1.6) at 140° C and 10 mm of Hg for 8 hours until constant weight is achieved at 120° C (xerogel formation), whereupon the 100 to 300 $\mu$m fraction is isolated,
2. doping this xerogel, in a second stage, with the desired amount of chromium trioxide (1% by weight, based on the xerogel and calculated as chromium) from a 20% w/w solution of chromium trioxide in acetone (containing 3% by weight of water) with evaporation of the solvent (using a stirred vessel provided with suction means, the temperature rising from boiling temperature to 120° C) and
3. maintaining the resulting product, in a third stage, at a temperature of 720° C for 90 minutes in a fluidized bed produced by moisture-free air. Polymerization Use is made of a stirred vessel (1 l useful capacity), in which 70 g of coarse-powdered polyethylene are placed to form a dry bed, which polyethylene is mixed with 0.3 g of the catalyst obtained as described above.

Polymerization is carried out at a constant ethylene pressure of 33 bars and a temperature of 100° C over a period of 2 hours.

There are obtained, over 2 hours, 1500 parts by weight of polyethylene per part by weight of catalyst, which polyethylene has an HLMI (melt index MFI 190/20 [g/10 min] according to ASTM 1238–65 T) of 7 and a relatively narrow grain size distribution with substantial absence of very fine portions.

EXAMPLE 2

Preparation of catalyst

This is carried out by
1. manufacturing, in a first stage, a silicic xerogel by
  1.1. taking a 3 wt.% solids aqueous solution of sodium metasilicate ($Na_2SiO_3 \cdot 9\ H_2O$) (solids calculated as silicon dioxide, $SiO_2$),
  1.2. replacing the sodium ions contained in this solution by hydrogen ions by means of an ion exchanger such that the sodium content (calculated as sodium oxide, $Na_2O$) in the silicic xerogel is 0.02% by weight,
  1.3. introducing into the resulting aqueous silicic acid solution a water-soluble aluminum salt (aluminum nitrate) and water so as to make the ratio of water to silicic acid (calculated as silicon dioxide, $SiO_2$) 100:1, by weight, and the ratio of silicic acid (calculated as silicon dioxide) to aluminum salt (calculated as aluminum oxide, $Al_2O_3$) 100:15 by weight.
  1.4. -
  1.5. adjusting the pH of the solution resulting from stage (1.3) (having a pH of 3.0) to a value of 8.0 by means of a water-soluble, neutralizing nitrogen-base compound (ammonia),
  1.6. extracting the solid-phase product obtained in stage (1.5) (silicic hydrogel) by means of acetone (water content below 1% by weight) in a Soxhlet extractor until the organic liquid absorbs no more water, and finally
  1.7. drying the dehydrated, organic liquid-saturated gel obtained in stage (1.6) for 7 hours at 130° C and a pressure of 10 mm of Hg until constant weight is achieved at 120° C (xerogel formation), whereupon the 100 to 300 μm fraction is isolated,
2. doping this xerogel, in a second stage, with the desired amount of chromium trioxide (1% by weight, based on the xerogel and calculated as chromium) from a 7% w/w solution of chromium trioxide in acetone (containing 3% by weight of water) with evaporation of the solvent (using a stirred vessel provided with suction means, the temperature rising from boiling temperature to 120° C) and
3. maintaining the resulting product, in a third stage, at a temperature of 720° C for 70 minutes in a moisture-free stream of oxygen.

Polymerization

Use is made of a stirred vessel (useful capacity 10 l), in which 3050 g of anhydrous pentane (as suspending agent) are placed, this having been previously mixed with 0.5 g of the catalyst obtained as described above.

Polymerization is carried out at a constant ethylene pressure of 33 bars and a temperature of 100° C over a period of 2 hours.

There are obtained, over 2 hours, 8600 parts by weight of polyethylene per part by weight of catalyst, which polyethylene has an HLMI (melt index MFI 190/20 [g/10 min] according to ASTM 1238–65 T) of 15.2 and a relatively narrow grain size distribution with substantial absence of very fine portions.

We claim:
1. A process for the manufacture of olefin polymers by polymerization of $C_{2-8}$ α-monoolefins at temperatures of from 60° to 160° C and olefin pressures of from 0.5 to 40 bars by means of a silicic xerogel/chromium trioxide catalyst obtained by (1) synthesizing a particulate silicic xerogel having a particle diameter of from 10 to 2000 μm, (2) doping said xerogel with from 0.1 to 10 percent by weight (based on the xerogel and calculated as chromium) of chromium trioxide or a chromium compound capable of conversion to chromium trioxide under the conditions of stage (3) and (3) finally maintaining the resulting product at a temperature of from 400° to 1100° C for 10 to 1000 minutes in a water-free stream of gas containing oxygen in a concentration of more than 10% v/v, wherein the silicic xerogel/chromium trioxide catalyst used is one which has been obtained by
  1. synthesizing the silicic xerogel in the first stage by
    1.1. taking an aqueous solution of a sodium silicate (water glass) which contains from 0.1 to 20% by weight of solids (calculated as silicon dioxide, $SiO_2$),
    1.2. exchanging the sodium ions contained in said solution for hydrogen ions by means of an ion exchanger so that the sodium content (calculated as sodium oxide, $Na_2O$) in the silicic xerogel is not more than 0.2%,
    1.3. introducing a water-soluble aluminum salt and, if necessary, water into the resulting aqueous silicic acid solution such that the ratio of water to silicic acid (calculated as silicon dioxide, $SiO_2$), by weight, is from 100:0.05 to 100:24 and the ratio of silicic acid (calculated as silicon dioxide) to aluminum salt (calculated as aluminum oxide, $Al_2O_3$), by weight, is from 100:100 to 100:2,
    1.4. adjusting, if necessary, the pH of the solution obtained in stage (1.3) to from 0.1 to 3.5 by means of a water-soluble inorganic acid such that the ratios of water to silicic acid and silicic acid to aluminum salt, by weight, remain in the ranges given under (1.3),
    1.5. adjusting the pH of the solution obtained in (1.3) or (1.4) to from 4 to 12 by means of a water-soluble nitrogen-base compound having a neutralizing action,
    1.6. extracting the resulting product in the solid phase obtained under (1.5) (silicic hydrogel) by means of an organic liquid selected from the series of $C_{1-4}$ alkanols and/or $C_{3-5}$ alkanones until the organic liquid absorbs no more water, and, finally,
    1.7. drying the dehydrated gel obtained in (1.6) and saturated with organic liquid for a period until no further loss of weight occurs at 120° C (xerogel formation).

* * * * *